United States Patent [19]

Pierson

[11] Patent Number: 4,865,687
[45] Date of Patent: Sep. 12, 1989

[54] ULTRASONIC SECURING METHOD

[75] Inventor: Charles W. Pierson, Rochester, N.Y.

[73] Assignee: Eastman Kodak Company, Rochester, N.Y.

[21] Appl. No.: 288,900

[22] Filed: Dec. 23, 1988

[51] Int. Cl.$^4$ .............................................. B29C 65/08
[52] U.S. Cl. ................... 156/73.1; 156/293; 264/23
[58] Field of Search ............. 156/73.1, 293, 580.1, 156/580.2; 264/23; 425/174.2; 228/1.1, 110

[56] References Cited

U.S. PATENT DOCUMENTS 3,464,102  9/1969  Soloff ................................ 156/73.1

FOREIGN PATENT DOCUMENTS 318443  10/1971  U.S.S.R. ............................ 156/73.1

Primary Examiner—Michael Wityshyn
Attorney, Agent, or Firm—William C. Dixon

[57] ABSTRACT

A method for securing first and second parts together via a spheroid, wherein the first part has a hole in it slightly smaller than the spheroid while the second part and spheroid each include ultrasonically fusible material. The method comprises placing the first part against the second part, placing the spheroid into the hole in the first part so that a portion of the spheroid extends through the hole and into contact with a portion of the second part, placing a concentrating horn of an ultrasonic power source in contact with the spheroid, and ultrasonically vibrating the horn to beat it against the spheroid and thus impart ultrasonic energy to both the spheroid and the second part, thereby heat-softening the spheroid and second part and causing the spheroid material to flow through the hole, fuse with the second part material, and overlap an adjacent portion of the first part, whereby the two parts, via the spheroid, are firmly secured together.

14 Claims, 2 Drawing Sheets

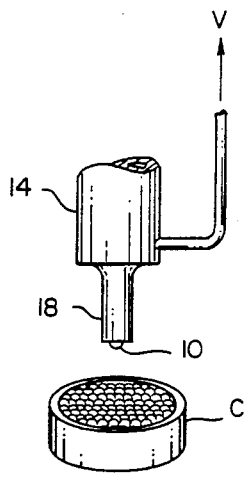
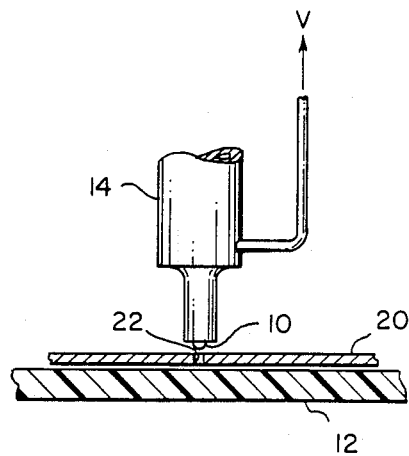
FIG. 4          FIG. 5
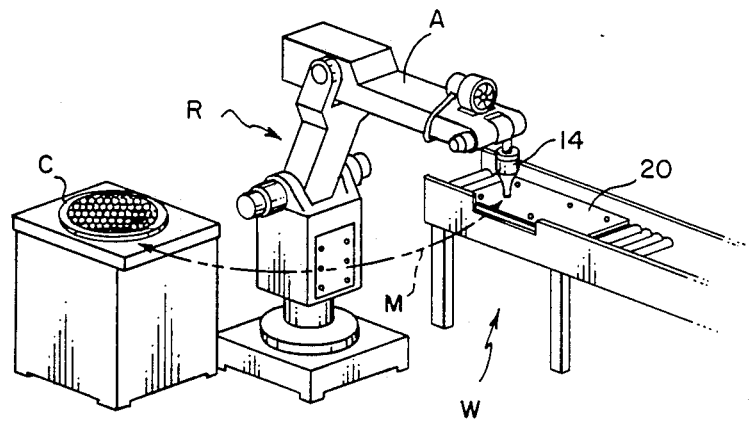
FIG. 6

ULTRASONIC SECURING METHOD

BACKGROUND OF THE INVENTION

1. Field of the Invention

The present invention relates generally to a method for securing component parts together, and particularly to such a method that is especially useful for securing parts made of dissimilar materials.

2. Description of the Prior Art

The prior art is replete with disclosures of various methods and apparatus for securing component parts together, including parts made of dissimilar materials. For example, U.S. Pat. No. 3,367,809 to Soloff discloses a method for ultrasonically staking thermoplastic parts to other parts. For another example, U.S. Pat. No. 3,483,611 to Balamuth et al. discloses methods and apparatus for ultrasonically staking and riveting component parts together. Also, U.S. Pat. No. 4,106,962 to Adams et al. discloses a method for ultrasonically securing metallic and thermoplastic parts together, wherein ultrasonic energy is applied to an apertured depression in the metallic part while the depression is pressed against the thermoplastic part, causing an adjacent portion of the thermoplastic part to soften, flow through the aperture, fill the depression therearound, and thereby lock the two parts together upon cooling.

FIG. 1 of the drawings herein illustrates a process, known in the prior art as conventional ultrasonic staking, which fuses parts together by using heat generated from contact together with mechanical pressure and high-frequency sound waves. To use ultrasonic staking effectively, it is necessary that one of the parts, such as substrate 1, be made of a material that responds to ultrasonic heating. The stake 2 is a raised feature on substrate 1. Hole 3 is provided in mating part 4 to fit over stake 2. After mating part 4 is properly aligned with substrate 1, stake 2 is heated by means of an ultrasonic horn 5. As stake 2 melts, pressure is maintained thereon. That presses the stake down, so that it becomes larger than hole 3. Horn 5 is then removed, leaving the two parts 1 and 4 held together in a manner that is similar to conventional riveting.

There are two disadvantages in using ultrasonic staking in an automated process: (1) ultrasonic-horn-to-stake alignment is critical, in that any misalignment adversely affects the integrity of the bond; and (2) any design changes require either retrofitting the old parts or fabricating new ones.

Conventional riveting is an alternative method for fastening parts together. This method also has disadvantages when used in an automated process. Holes are necessary in both parts being joined. A rivet must be placed in those holes and forced down, holding the parts together mechanically. Properly aligning the holes and properly orienting the rivet make conventional riveting difficult to automate.

SUMMARY OF THE INVENTION

Even though conventional ultrasonic staking and conventional riveting are not ideally suited for use in an automated assembly process, they do offer some advantages. The advantages of both of those methods are achieved by the new method of this invention using an ultrasonic spherical rivet, or spheroid, to secure component parts together. Like conventional ultrasonic staking, the spheroid needs a hole only in the mating part. Unlike conventional ultrasonic staking, the underlying part, or substrate, is featureless. Like conventional riveting, the spheroid is a separate piece that is used to hold the two joined parts together. Unlike conventional riveting, orientation of the spheroid is not necessary. Ultrasonic spherical rivets, or spheroids, as provided by this invention are thus well suited for automated processes because: (1) their shape eliminates the orientation requirement; (2) ultrasonic horn alignment is less critical; and (3) only one hole need be aligned.

The present invention finds utility in a method for securing a first part to a second part made of ultrasonically fusible material, the method comprising the steps of: providing an aperture in the first part; placing the first part on the second part so that the aperture in the first part overlies a portion of the second part; providing a spheroid of ultrasonically fusible material slightly larger than the aperture in the first part; positioning the spheroid in the aperture so that a portion of the spheroid extends through the aperture and into contact with the underlying portion of the second part; pressing the spheroid against the second part; and applying ultrasonic energy to the spheroid so as to heat-soften the spheroid and the underlying portion of the second part, and thereby cause the spheroid material to flow through the aperture and fuse with the second part material; whereby the first part is secured to the second part.

This invention, and its objects and advantages, will become more apparent in the detailed description of the illustrated embodiment thereof presented hereinbelow.

BRIEF DESCRIPTION OF THE DRAWINGS

In the detailed description of the embodiment of this invention presented below, reference is made to the accompanying drawings, wherein like reference characters denote like elements, and wherein:

FIGS. 4 and 5 depict stages in the illustrated embodiment preceding that shown in FIG. 2; and FIG. 6 is a pictorial perspective view illustrating an automated embodiment of an ultrasonic spherical riveting system in accordance with the present invention.

DESCRIPTION OF THE ILLUSTRATED EMBODIMENT

Because certain parts of, and practices relating to, ultrasonic fastening apparatus and methods are well known, the following description is directed in particular to those elements and steps forming or cooperating directly with this invention. Elements and steps not specifically shown or described herein are selectable from those known in the relevant art.

Figure 1:
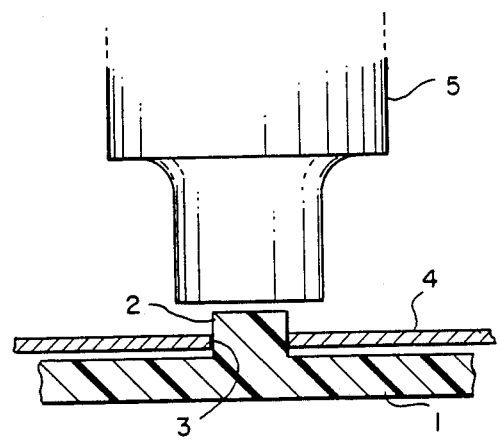
FIG. 1 is an elevational view, partly in section, illustrating conventional ultrasonic staking as known in the prior art.
Figure 2:
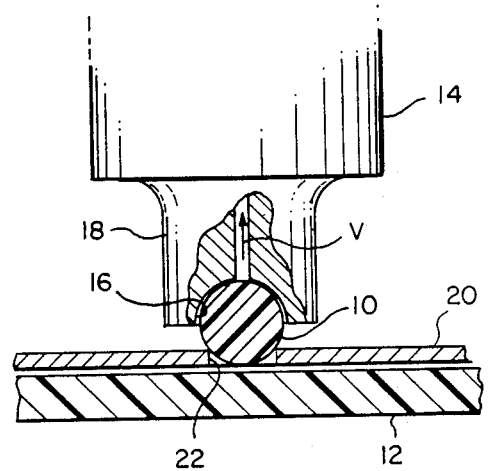
FIG. 2 is an elevational view, partly in section similar to FIG. 1, but illustrating an embodiment of the ultrasonic spherical riveting method of this invention.

Shown in FIG. 2 is an ultrasonic spherical rivet, or spheroid, 10 made of an ultrasonically fusible thermoplastic material for bonding to an ultrasonically fusible thermoplastic substrate 12. An ultrasonic horn 14 has a hemispherical depression 16 in its tip 18 that is formed to fit over the spheroid 10. Vacuum V is applied to depression 16 to pick up and releasably retain spheroid 10 from a supply of spheroids held in a container C (shown in FIG. 4). Horn 14, which could be mounted on the end of a robot arm A (shown in FIG. 6), is then positioned over the part 20 that is to be joined to substrate 12 (as shown in FIG. 5). A circular hole or aperture 22, slightly smaller than the spheroid, is provided in part 20. Horn 14 is then lowered to a deposit spheroid 10 in hole 22 so that a lower portion of the spheroid extends through the hole and into contact with the underlying portion of the substrate.

Figure 3:
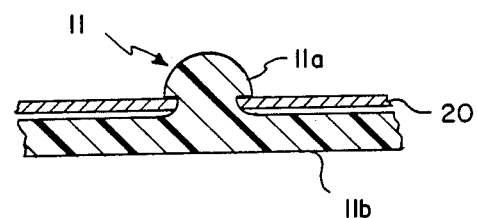
FIG. 3 is a cross-sectional elevation illustrating the parts shown in FIG. 2 after they have been joined together.

While pressure is maintained by tip 18 bearing down upon spheroid 10, vacuum V is turned off and horn 14 is activated. The portion of spheroid 10 that is in contact with substrate 12 then begins to melt. Ultrasonic energy also is transferred to substrate 12, and it too begins to melt. The melting action fuses the spheroid to the substrate. Horn 14 is then deactivated. When the joined parts have cooled sufficiently, horn 14 is retracted, leaving part 20 firmly secured to substrate 12 by the combination 11 comprising fused spheroid portion 11a and fused substrate portion 11b (as shown in FIG. 3). It will be noted that the fused spheroid portion 11a has completely filled hole 22 and overlaps an adjacent surrounding portion of part 20, thus positively locking the joined parts together.

FIG. 6 illustrates an automated embodiment of this invention, wherein a robot R, with horn 14 mounted on arm A thereof, moves the horn from container C, along movement path M, to a site immediately above part 20 superposed upon substrate 12 (not shown) at work station W.

The ultrasonic spherical rivet, or spheroid, of this invention offers some very useful advantages over both conventional riveting and ultrasonic staking. Conventional riveting requires holes in both parts to be joined; the spheroid of this invention requires a hole in only one of those parts. This feature thus eliminates any need for hole alignment. Also, conventional rivets must be oriented correctly before being used; the spheroid's symmetry eliminates that need. Ultrasonic staking requires special preforming or prefabrication of the substrate; the spheroid works with an unfeatured substrate, and design changes do not entail any special treatment of the substrate. Ultrasonic spherical rivets, or spheroids, are thus well suited for use in automated parts-assembly systems.

Although the above-described embodiment of this invention is depicted as using a plastic spheroid fusible with a plastic substrate, the invention also contemplates use of various metals as the ultrasonically fusible materials for the spheroid and the substrate. It should therefore be understood that, while this invention has been described with particular reference to the embodiment illustrated herein, variations and modifications can nonetheless be effected within the spirit and scope of the invention.

I claim:

1. A method for securing one part having a hole therein to another part made of ultrasonically fusible material, said method comprising the steps of:
   placing said one part against said other part; placing a spheroid of ultrasonically fusible material slightly larger than said hole into said hole so that a portion of said spheroid extends through said hole and into contact with a portion of said other part;
   placing a coupler member in contact with said spheroid; and
   ultrasonically vibrating said coupler member against said spheroid, so that ultrasonic energy is coupled into said spheroid and thence into said portion of said other part, to heat and thus soften both said spheroid and said other part, and thereby cause said spheroid material to flow through said hole and fuse with said other part material;
   whereby said one part is secured to said other part.

2. A method as claimed in claim 1 wherein said spheroid material and said other part material are each thermoplastic.

3. A method as claimed in claim 2 wherein said spheroid material, when caused to flow through said hole and fuse with said other part material, fills said hole and overlaps an adjacent portion of said one part.

4. A method as claimed in claim 1 wherein said coupler member is a concentrating horn of an ultrasonic power source.

5. A method as claimed in claim 4 wherein said horn includes a tip having a substantially hemispherical depression therein adapted to receive and coact with said spheroid.

6. A method as claimed in claim 5 wherein said horn further includes means for communicating vacuum to said depression so as to hold said spheroid therein prior to said vibrating step.

7. A method for securing a first part to a second part made of ultrasonically fusible material, said method comprising the steps of:
   providing an aperture in said first part; placing said first part on said second part so that said aperture in said first part overlies a portion of said second part;
   providing a spheroid of ultrasonically fusible material slightly larger than said aperture;
   positioning said spheroid in said aperture so that a portion of said spheroid extends through said aperture and into contact with said portion of said second part;
   pressing said spheroid against said second part; and
   applying ultrasonic energy to said spheroid so as to heat-soften said spheroid and said portion of said second part and thereby cause said spheroid material to flow through said aperture and fuse with said second part material;
   whereby said first part is secured to said second part.

8. A method as claimed in claim 7 wherein said spheroid material and said second part material are each thermoplastic.

9. A method as claimed in claim 8 wherein said aperture is substantially circular.

10. A method as claimed in claim 9 wherein said spheroid material, when caused to flow through said aperture and fuse with said second part material, fills said aperture and overlaps an adjacent portion of said first part.

11. A method as claimed in claim 7 wherein said ultrasonic energy applying step includes placing a concentrating horn of an ultrasonic power source against said spheroid and then activating said horn to vibrate said horn and thereby impart ultrasonic energy therefrom to said spheroid and thence to said portion of said second part.

12. A method as claimed in claim 11 wherein said ultrasonic energy applying step further includes providing said horn with a tip having a substantially hemispherical depression therein to cooperate with said spheroid.

13. A method as claimed in claim 12 wherein said spheroid positioning step includes receiving said spheroid in said depression, communicating vacuum to said depression to retain said spheroid therein, placing said tip at a site immediately over said aperture so as to position said portion of said spheroid in said aperture, and then discontinuing said vacuum to said depression to release said spheroid.

14. A method as claimed in claim 13 wherein said spheroid positioning step further includes receiving said spheroid in said depression from means containing said spheroid among a plurality thereof, and then moving said tip from said containing means to said site.

* * * * *